United States Patent [19]
Kobayashi et al.

[11] Patent Number: 5,307,066
[45] Date of Patent: Apr. 26, 1994

[54] MICROPROCESSOR CONTROLLED CONVERTER HAVING REDUCED NOISE INTERFERENCE AND METHOD OF OPERATING SAME

[75] Inventors: Jiro Kobayashi; Satoru Suwabe; Syunji Abe, all of Tokyo, Japan

[73] Assignee: Oki Electric Industry Co., Ltd., Tokyo, Japan

[21] Appl. No.: 834,579

[22] PCT Filed: Jun. 10, 1991

[86] PCT No.: PCT/JP91/00774
§ 371 Date: Mar. 27, 1992
§ 102(e) Date: Mar. 27, 1992

[87] PCT Pub. No.: WO91/20051
PCT Pub. Date: Dec. 26, 1991

[30] Foreign Application Priority Data
Jun. 11, 1990 [JP] Japan ................ 1-151813

[51] Int. Cl.$^5$ .................................................. H03M 1/12
[52] U.S. Cl. .................................. 341/155; 364/241.2
[58] Field of Search .............. 341/155, 166, 158, 164; 395/375; 364/239, 241.2, 241.6

[56] References Cited

U.S. PATENT DOCUMENTS
4,996,639  2/1991  Ishimoto et al. .................... 364/200

FOREIGN PATENT DOCUMENTS
63-310058  12/1988  Japan .
1-58043    3/1989   Japan .
1-58044    3/1989   Japan .

OTHER PUBLICATIONS
Burton et al. "Microprocessor Systems Handbook", 1977, pp. 157-161.

Primary Examiner—Brian K. Young
Attorney, Agent, or Firm—Edward D. Manzo

[57] ABSTRACT

In a microcomputer provided with a CPU which processes digital signals under control of program instructions, and a converter which converts between analog and digital signals, the operation of the converter is controlled to improve reliability and increase CPU efficiency. In response to a control output from the CPU a conversion control circuit passes an operation stop signal to the CPU during a limited period of conversion in which, for example, conversion accuracy is significantly influenced by CPU noise generation.

15 Claims, 3 Drawing Sheets

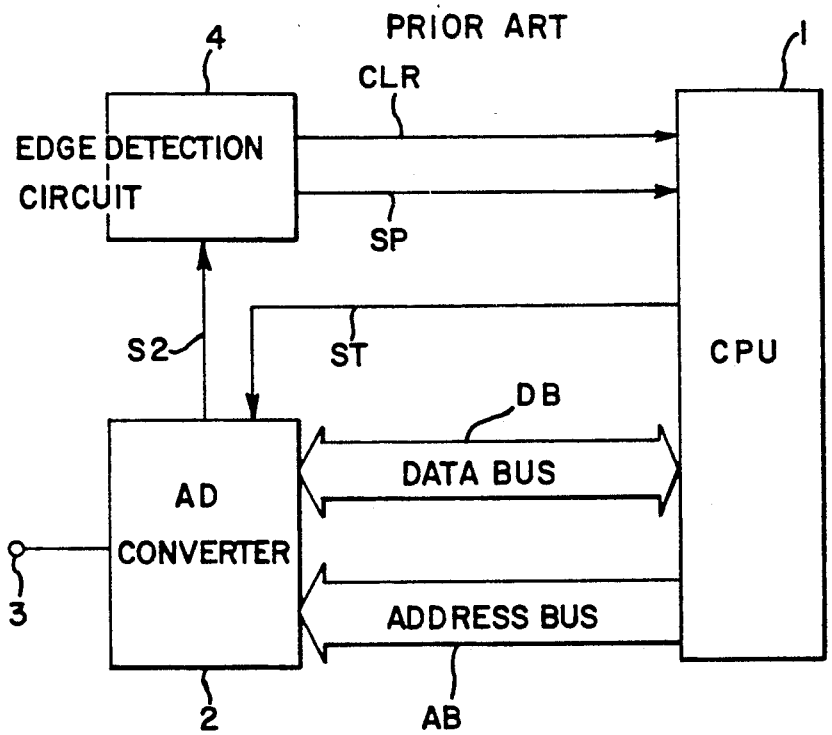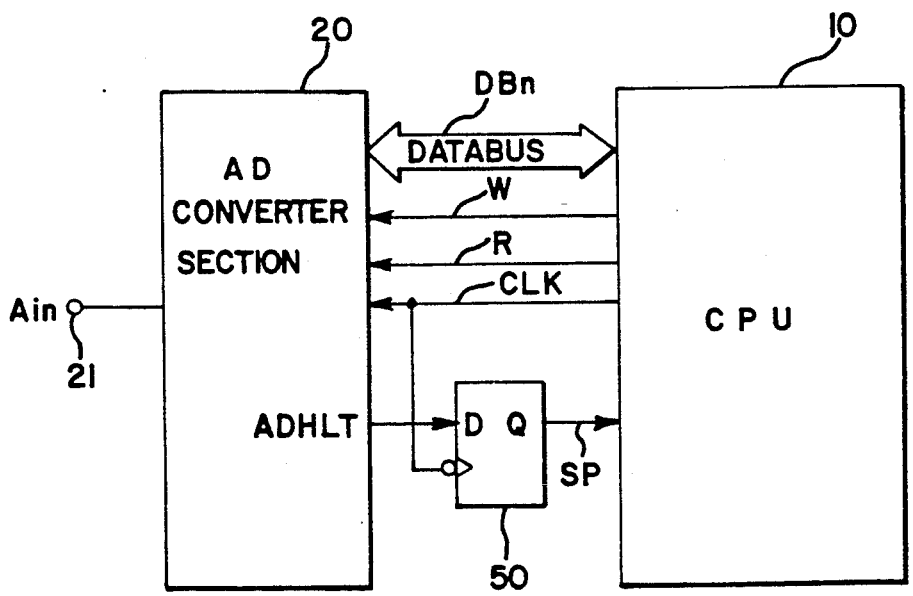

MICROPROCESSOR CONTROLLED CONVERTER HAVING REDUCED NOISE INTERFERENCE AND METHOD OF OPERATING SAME

INDUSTRIAL FIELD

The present invention relates to a microcomputer with built-in converters, and more particularly relates to a microcomputer which prevents degradation of conversion accuracy due to noises, where the conversion is done on built-in type analog to digital converters (hereinafter referred to as "AD converters"), digital to analog converters (hereinafter referred to as "DA converters"), or a combination of these converters.

BACKGROUND OF THE INVENTION

One typical example of a conventional microcomputer is disclosed in Japanese Laid Open Publication No. 64-58043. Its configuration will be explained hereinafter referring to drawings. FIG. 2 is a block diagram of one example of the conventional microcomputer with built-in converters.

This microcomputer incorporates a central processing unit (hereinafter referred to as "CPU") 1 which is adapted for processing digital signals in response to instructions provided by a given program. An AD converter 2 is connected to this CPU 1 via a data bus DB and an address bus AB. The AD converter 2 converts each analog signal received at an analog input terminal 3 to a corresponding digital signal in accordance with a conversion initiation signal ST from the CPU 1. After the conversion, the AD converter 2, on one hand, passes the digital signal to the CPU 1 via the data bus DB and, on the other hand, generates an AD selection signal S2.

An edge detection circuit 4 is connected to the CPU 1 as well as to the AD converter 2. The edge detection circuit 4 detects the (conversion) state of the AD converter 2 in response to the AD selection signal S2 and provides a CPU stop signal SP or clear signal CLR to the CPU 1.

In the case of a microcomputer of this type, the CPU 1 passes, via the address bus AB, to the AD converter 2 each address which was sequentially given to the AD converter 2 by the given program. Thereupon, the AD converter 2 is selected and an AD selection signal S2 generated by the selected AD converter 2 will become active. In so doing, it shifts from "L" level to a "H" level. The edge detection circuit 4 detects a rise of the AD selection signal S2, i.e. from the "L" level to the "H" level and passes the CPU stop signal SP to the CPU 1 to interrupt of CPU operation.

On receipt of the CPU stop signal SP, the CPU 1 is put in a stop mode and concurrently passes the AD conversion initiation signal ST to the AD converter 2 to initiate its operation. As a result, the AD converter 2 converts an analog signal received at the analog input terminal 3 to a corresponding digital signal. After passage of a prescribed period, the AD selection signal S2 outputted from the AD converter 2 shifts from the "H" level to the "L" level. This shift in level is detected by the edge detection circuit 4 which in turn passes the clear signal CLR to the CPU 1 so that the CPU 1 restarts its operation.

As stated above, the conventional microcomputer is associated with the edge detection circuit 4 which detects the conversion carried out by the AD converter 2 so that, when the AD converter 2 is in operation, the edge detection circuit 4 outputs a CPU stop signal SP to halt major operations of the CPU 1. Consequently, generation of noises by the CPU 1 during the AD conversion process is reduced so as not to interfere with the accuracy of the AD converter 2 during these operations. However, the efficiency of microcomputer using this architecture is severely diminished because once the CPU 1 is put in a halt mode by the AD converter 2 (or alternatively a DA converter), the CPU 1 cannot perform any operations other than the AD conversion (or alternatively DA conversion) thereby causing a serious problem of low operation. When a microcomputer is provided with a halt mode for halting operation of the CPU itself, a similar procedure can be carried out by an appropriate program without use of the edge detection circuit 4.

It is the basic object of the present invention to provide a microcomputer with built-in converters which assures high accuracy in AD or DA conversion without increase of circuit size and any significant degradation in CPU operation efficiency.

SUMMARY OF THE INVENTION

In accordance with the basic aspect of the present invention, a conversion control circuit is incorporated in a microcomputer which is provided with a CPU adapted for processing digital signals under control of program instructions and AD or DA converters adapted for conversion between analog and digital signals. The conversion control circuit controls operation of the converters in response to a control output from the CPU and passes an operation halt signal to the CPU during a specified period related to the converters, e.g. a period in which an influence appears on conversion accuracy during operation of the converters. With this construction, the conversion control circuit controls operation of the converters on receipt of a conversion initiation instruction which is generated by the CPU following the program instructions. Each converter passes a digital signal to the CPU after conversion from a corresponding input analog signal or, alternatively, generates an analog signal after conversion from a corresponding digital signal received from the CPU.

During this conversion, the conversion control circuit passes the operation halt signal to the CPU only over the specified period in which conversion is most influenced by noises. Thereupon, the CPU halts its operation only during the specified period. Thanks to this halt of CPU operation deleterious consequences of the noises on the converter are mitigated and the conversion accuracy of the converter is much improved. In addition, the CPU may operate even during the conversion process so as to improve the operational efficiency of the CPU, thereby solving the aforementioned problems.

BRIEF DESCRIPTION OF THE DRAWINGS

In describing the preferred embodiment, reference is made to accompanying drawings wherein:

FIG. 2 is a block diagram of one example of the conventional microcomputer with built-in converters, FIG. 3 is a block diagram of the main part of one embodiment of the microcomputer in accordance with the present invention.

DESCRIPTION OF THE PREFERRED EMBODIMENTS

One embodiment of a microcomputer in accordance with the present invention is shown in FIG. 3 in which the microcomputer is provided with a CPU 10 adapted for running programs stored in its memories (not shown). The CPU 10 includes an operator section for performing arithmetic and logic operations, a controller section for controlling all operations of the CPU, and a register section functioning as an internal memory. The CPU 10 passes AD initiation data to an AD converter section 20 via a data bus DBn. The CPU 10 further passes writing signals W, reading signals R and clock pulses CLK to the AD converter section 20. On receipt of the operation stop signal SP, the CPU 10 halts all of its main operations except for output of the clock pulses.

On receipt of the AD conversion initiation data and the writing signal W from the CPU 10 via the data bus DBn, the AD converter section 20 operates to convert an analog signal Ain received at an analog input terminal 21 to a corresponding digital signal. During conversion, the AD converter section 20 generates an operation halt signal ADHLT over a specified period in which its conversion accuracy would be influenced. The output terminal for this operation halt signal ADHLT are connected to an input terminal D of a delay-type flip-flop (hereinafter referred to as "D-FF") 50.

The clock pulses CLK from the CPU 10 is inputted to a clock pulse input terminal of D-FF 50 and the operation stop signal SP appearing at its output terminal Q is supplied to the CPU 10. The D-FF 50 initiates its operation at every falling of the clock pulses to generate the operation stop signal SP.

Figure 1:
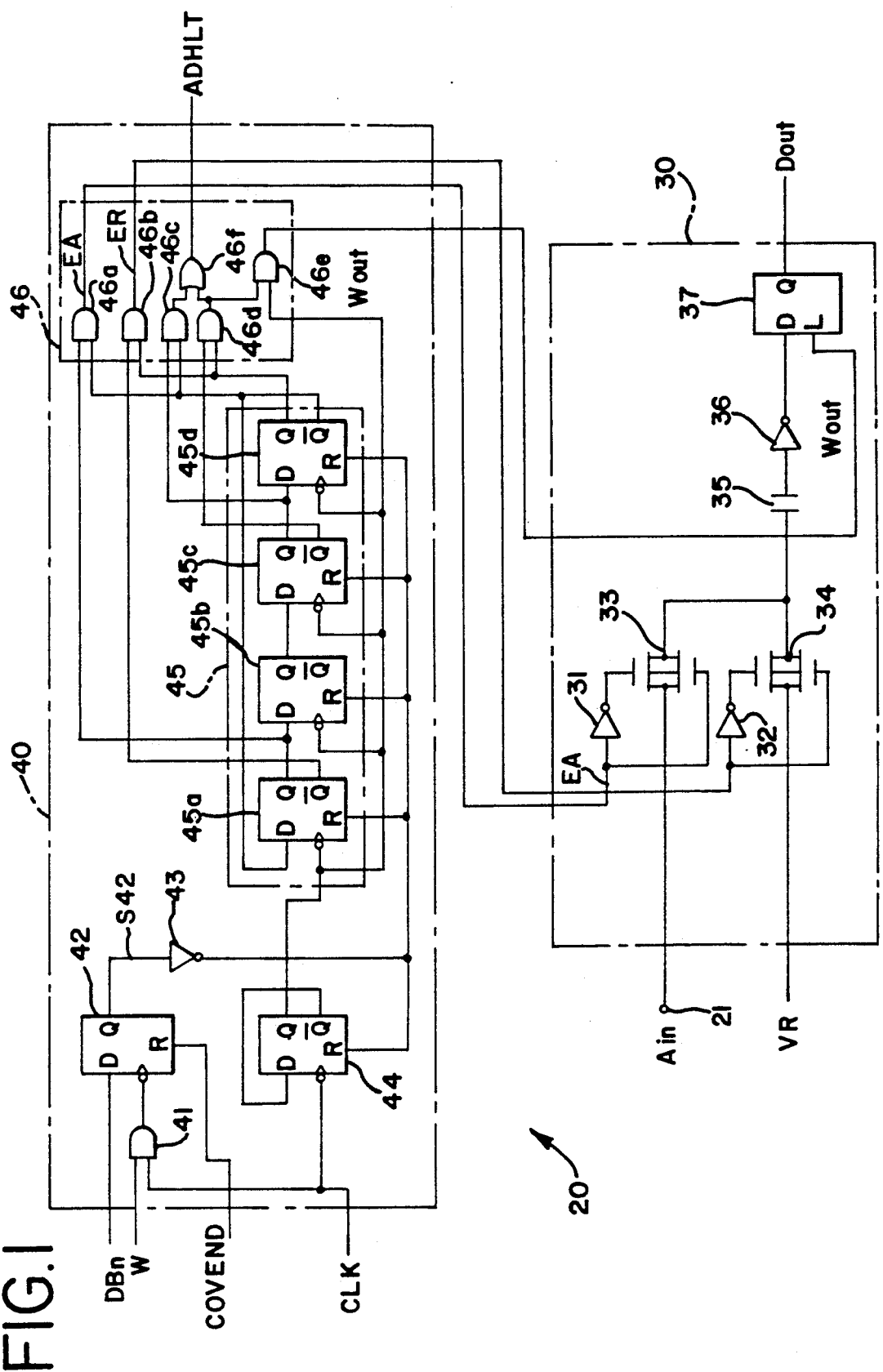
FIG. 1 is a circuit diagram of the main part of an AD converter utilized in the microcomputer in accordance with the present invention.

Turning now to FIG. 1, the AD converter section 20 includes, for example, a chopper-type AD converter 30 and a conversion control circuit 40 for controlling operation of the AD converter 30.

The AD converter 30 includes an inverter 31 adapted for inversion of a control signal EA used for control of analog input signals, an inverter 32 adapted for inversion of a control signal ER used for input control of a reference voltage V, an analog switch 33 adapted for input control of the analog signal Ain in accordance with the control signal EA and an output signal from the inverter 31, and an analog switch 34 adapted for input control of the reference voltage VR in accordance with the control signal ER and an output signal from the inverter 32. The analog switches 33 and 34 are connected to a comparator 36 through a capacitor 35 in common. An output terminal of the comparator 36 is connected to an input terminal D of a latch circuit 37. The latch circuit 37 latches an output signal from the comparator 36 in response to a latch signal Wout received at its latch input terminal L. After the latching, digital signals Dout, which corresponds to latched data, appears at an output terminal Q. The digital signals Dout are sequentially stored at a register (not shown) over the bit number of the AD converter. Thereafter, the digital signals Dout are passed to the CPU 10 via the data bus DBn shown in FIG. 3.

The conversion control circuit 40 incorporates a dual input AND-gate 41 which receives the writing signal W and clock pulses CLK from the CPU 10. The output terminal of the AND-gate 41 is connected to a clock input terminal of a D-FF 42. When the writing signal W received from the CPU 10 falls, the D-FF 42 reads information on the data bus DBn through its input terminal D and generates a conversion initiation signal S42 at its output terminal Q. The D-FF 42 is involved in control of initiation of operation of the conversion control circuit 40 as well as in initialization of the conversion control circuit 40 in response to a conversion termination signal COVEND received at its reset terminal R.

The output terminal Q of the D-FF 42 is connected to respective reset terminals of a D-FF 44 and a counter 45 such as a Johnson counter through an inverter 43. The D-FF 44 is adapted for dividing by two each clock pulse CLK received at its clock input terminal and to provide the divided output through its output terminal Q. The outputs from the D-FF 44 are supplied as clock pulses to the counter 45. The counter 45 includes, for example, four sets of D-FFs 45a to 45d connected in series. An output terminal $\overline{Q}$ of the last stage D-FF 45d is connected to an input terminal D of the first stage D-FF 45a.

A logic circuit 46 is connected to an output terminal of the counter 45. Depending on a logic value of the output signal from the counter 45, the logic circuit 46 outputs the control signals EA and ER, the latch signal Wout and the conversion halt signal ADHLT. The logic circuit 46 includes dual-input AND-gates 46a to 46e and a dual-input OR-gate 46f.

Figure 4:
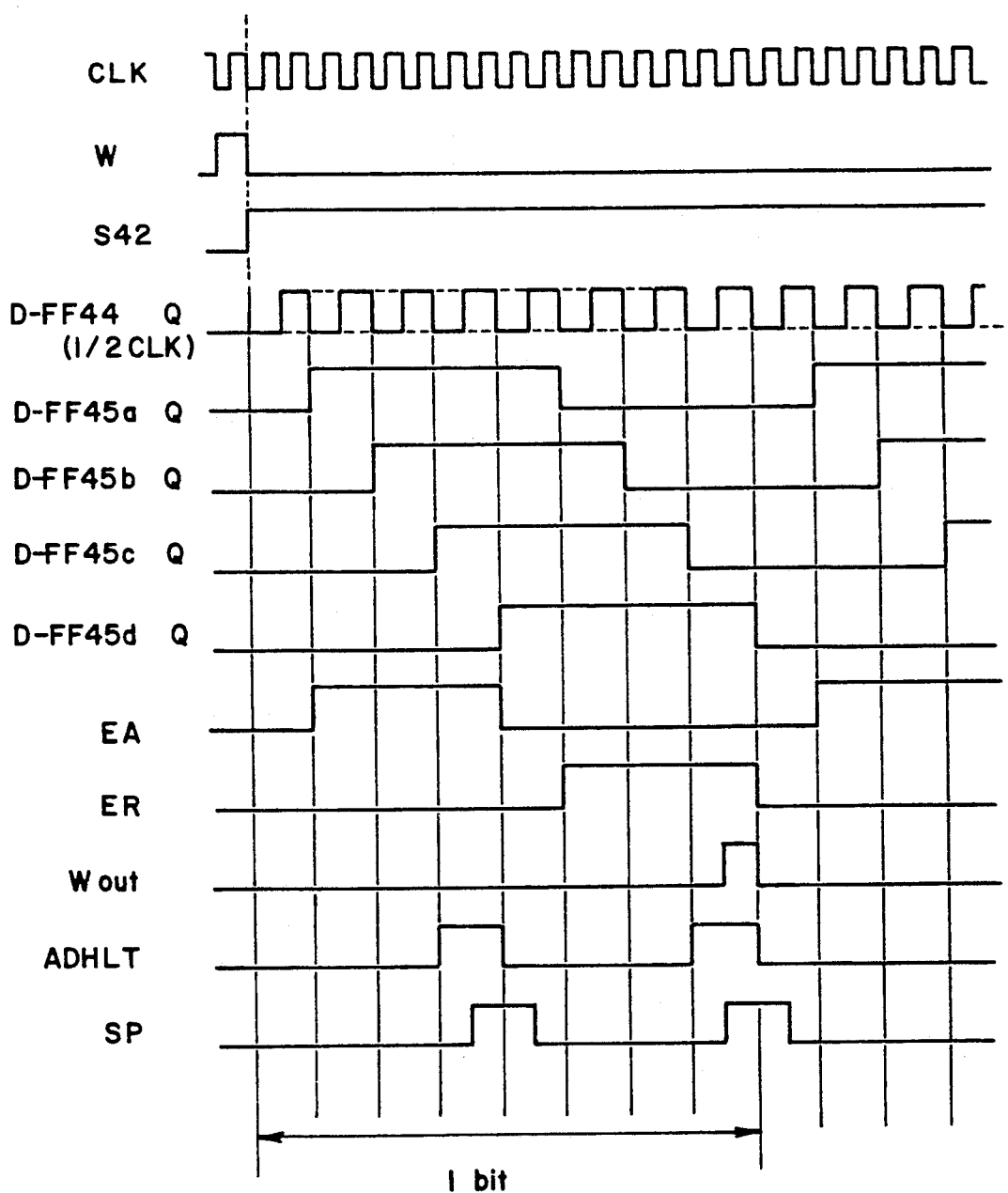
FIG. 4 is a timing diagram of various signals processed in the microcomputer shown in FIGS. 1 and 3.

FIG. 4 depicts time-functional changes of various signals processed in the circuits shown in FIGS. 1 and 3.

A operation of the microcomputer in accordance with the present embodiment will be explained hereinafter in reference to the above drawings.

The CPU 10 issues addresses allotted to the AD converter section 20 and AD conversion data via the data bus DBn as well as the writing signal W to initiate operation of the AD converter section 20.

Within the AD converter section 20 shown in FIG. 1, the D-FF 42 of the conversion control circuit 40 takes up an "H" level signal from the data bus DBn when the writing signal W from the CPU 10 falls to output the conversion initiation signal S42 of an "H" level via its output terminal Q. This conversion initiation signal S42 is inverter at the inverted 43 to drive the reset terminals R of the D-FF 44 and the D-FF 45a to 45d in the counter 45 to "L" levels. Then, the D-FF 44 divides by two the clock pulse CLK from the CPU 10 to generate a divided clock pulse ½CLK at its output terminal Q, which is then passed to the clock input terminals of the D-FF 45a to 45d in the counter 45. (As shown in FIG. 4, the clock signal is divided by two in frequency.)

On receipt of the divided clock pulse ½CLK, the D-FF 45a to 45b perform counting operations to output counted results via the respective output terminals Q. Logic combinations of the counted results are discerned at the AND-gates 46a to 46e and the OR-gate 46f to generate the control signals EA and ER, the latch signal Wout and the operation halt signal ADHLT depending on the result of the logic operation.

The control signal EA outputted from the AND-gate 46a assumes an "H" level when the output terminal Q of the D-FF 45a is an "H" level and the output terminal $\overline{Q}$ of the D-FF 45d is an "H" level. The control signal ER outputted from the AND-gate 46b assumes an "H" level when the output terminal $\overline{Q}$ of the D-FF 45a is an "H" level and the output terminal Q of the D-FF 45d is an "H" level. The latch signal Wout outputted from the AND-gate 46e assumes an "H" level when the output terminal $\overline{Q}$ of the D-FF 45c is an "H" level, the output terminal Q of the D-FF 45d is an "H" level and the output terminal Q of the D-FF 44 is an "H" level. The operation halt signal ADHLT outputted from the OR-gate 46f assumes an "H" level when the output terminal Q of the D-FF 45c is an "H" level and the output terminal $\overline{Q}$ of the D-FF 45d is an "H" level, or when the output terminal $\overline{Q}$ of the D-FF 45c is an "H" level and the output terminal Q of the D-FF 45d is at "H" level, respectively.

Thus, since the conversion initiation signal S42 outputted from the D-FF 42 assumes an "H" level, the control signal EA goes high to after a delay of 2CLK to turn on analog switch 33 via the inverter 31 in the AD converter 30. Since the control signal ER is still low at this moment, the analog switch 34 is in an off state in the AD converter 30. When the analog switch 33 turns on, the analog signal Ain received at the analog input terminal 21 is coupled to the capacitor 35 via the analog switch 33 and capacitor 35 is charged (or discharged) according to the input signal Ain.

After holding the "H" level over a period of 6CLK, the control signal EA assumes an "L" level and, as a consequence, the analog switch 33 turns to an off state. Two clock periods later, the control signal ER assumes an "H" level to turn on analog switch 34. This permits a reference voltage VR, which is generated by a certain analog circuit (not shown) in the conversion control circuit 40, to be applied to the capacitor 35 via the analog switch 34. The charge stored on capacitor 35 is thereby modified (for VR≠0) for the six clock periods that ER is high. It will be understood that if Ain is positive and VR is negative, or vice versa, a relative comparison of these signals can occur. A comparison between the analog signal Ain (which charged the capacitor 35) and the reference voltage VR by the comparator 36 which in turn passes a result to the input terminal D of the latch circuit 37. Latching by the latch circuit 37 is carried out in response to a latch signal Wout going high with a delay of 6CLK after the control signal ER has assumed the "H" level.

After holding the "H" level for a period of 6CLK, the control signal ER drops to an "L" level and, after passage of a period of 2CLK, the control signal EA assumes an "H" level. The AD converter 30 repeats the above-described operation to the maximum bit number of its resolving power and thereafter terminates AD conversion.

When the AD converter 30 has, for example a resolving power of maximum 10 bits, a period of 16CLK is necessary for AD conversion of 1 bit as shown in FIG. 4 and, as a result, the AD converter 30 terminates its operation after a total period of 160CLK. As the operation is terminated, the conversion termination signal COVEND is generated by an appropriate circuit (not shown) contained in the conversion control circuit 40, which resets the D-FF 42.

The conversion initiation signal S42 is inverted at the inverter 43 to assume an "H" level, which resets the D-FF 44 and 45a to 45d. Thus, each output terminal Q assumes an "L" level whereas each inverted output terminals $\overline{Q}$ assumes an "H" level. As a result, the conversion control circuit 40 is initialized to terminate the AD conversion. The digital signals Dout from the output terminal Q of the latch circuit 37 are sequentially stored in a register (not shown) for the bit number of the AD converter and, on receipt of a reading signal from the CPU 10, passed the CPU 10 via the data bus DBn.

When the CPU 10 continues its operation during operation of the AD converter 30, generation of noises from the CPU 10 tends to degrade AD conversion accuracy. In order to evade the inconvenience, it can be considered to interrupt the operation of the CPU 10 during the AD conversion. Such interruption, however, lowers the operational efficiency of the CPU 10. Here, it should be appreciated that the period of accuracy degradation by noise generation is limited in the time span of the AD conversion by the AD converter 30.

When noises are generated just before termination of analog input charge to the capacitor 35 shown in FIG. 1, no charge can be carried out at a normal voltage level. Further, when noises are generated just before termination of comparison between the analog input that charged the capacitor 35 and the reference voltage, i.e. just before latching of the result of the comparison by the latch circuit 37, no comparison can be carried out at a normal voltage level. In contrast to the generation of noises at the rising of the edge control signal EA in FIG. 4 and the early half of the EA signal period has no substantial influence on conversion accuracy as long as there is no substantial noise generation during the later half of the signal period.

In accordance with the present invention, the conversion halt signal ADHLT outputted from the OR-gate 46f in FIG. 1 is forced to assume an "H" level during operation of the AD converter 30, in particular during the above-described limited period of significant noise sensitivity. This "H" level conversion signal ADHLT is then passed to the input terminal D of the D-FF 50 in FIG. 3. Then, the D-FF 50 takes in the conversion halt signal ADHLT at rising of each clock pulse CLK from the CPU 10 to shift the CPU stop signal SP, which is passed to the CPU 10 via its output terminal Q, to an "H" level. On receipt of this stop signal SP, the CPU 10 ceases all of its operations except for generation of the clock pulses CLK.

As stated above, major operations of the CPU 10 are interrupted (suspended) by the CPU stop signal SP only during the limited periods when converter 30 is most sensitive to noise. This specified; interruption in CPU operation reliably prevents degradation in conversion accuracy which would otherwise be caused during AD conversion. In addition, because the interruption is relatively brief, the CPU 10 is allowed to be involved in operations other than the AD conversion. As a consequence, AD conversion can be carried out with a high degree of accuracy without causing a substantial lowering in the operational efficiency of the CPU 10.

The present invention is not limited to be applied to the embodiments illustrated in the drawings. Some other variations are as follows:

(a) The AD converter 30 shown in FIG. 1 may be given in the form of a serial comparison type AD converter. The conversion control circuit 40 can also be more or less varied by use of other types of flip-flop and/or gate circuits.

(b) The D-FF 50 in FIG. 3 may be incorporated in the AD converter section 20 or in the CPU 10.

(c) The AD converter section 20 is connected to the CPU 10 in the case of the foregoing embodiments. However, a DA converter may be additionally connected to the CPU 10. As an alternative for the AD converter section 20, a DA converter section may be connected to the CPU 10.

APPLICABILITY FOR THE INDUSTRY

In accordance with the present invention, major operations of a CPU are interrupted by a CPU stop signal during only a limited period of significant noise susceptibility. As a consequence, degradation in conversion accuracy by CPU noises is reliably forestalled. Since the length of interruption is quite limited, the CPU is able to carry out other operations in addition to the conversion. High level of conversion accuracy is assured with no substantial loss in operation efficiency.

We claim:

1. A microcomputer having a central processing unit to process digital signals under control of program instructions and an analog to digital (A/D) converter to perform conversion between analog and digital signals, comprising:
    a first node to receive analog signals;
    a second node to receive a reference voltage;
    a counter responsive to a clock signal to define a first period and a second period after said first period;
    a first switch to apply said analog signals received at said first node to said A/D converter during said first period;
    a second switch to apply said reference voltage received at said second node to said A/D converter during said second period; and
    a halting circuit to interrupt operation of said central processing unit during a third period, the third period including an end of said first period and being shorter than said first period, said halting circuit further interrupting the operation of said central processing unit during a fourth period, the fourth period including an end of said second period and being shorter than said second period.

2. In combination:
    a microcomputer with a central processing unit which processes digital signals under the control of program instructions:
    the microcomputer having built-in converters which convert between analog and digital format:
    a converter control circuit responsively coupled to the CPU and providing a stop operational signal to said CPU during only a portion of the operation of said converters, wherein said control circuit causes said converters to receive an analog signal over first periods and to receive a reference signal over second periods, and wherein the control circuit generates corresponding first and second stop operation signals during concluding portions of said first and second periods.

3. The combination of claim 2 wherein said first and second stop operation signals endure for limited times beyond the end of said first and second periods, respectively.

4. A method of scheduling the operations of converting data between digital and analog form in a converter built into a microcomputer and processing digital signals in a central processing unit (CPU) of the microcomputer, comprising the steps of:
    operating the converter; and
    providing a stop operation signal to the CPU during only a portion of the operation of said converter, wherein said converting steps are susceptible to noise from CPU operations during selected times, and wherein said stop operation signal is provided during such times but not during the entire operation of the converter,
    wherein said step of operating the converter includes applying an analog signal over first periods within said converter and applying a reference signal over second periods within said converter, and
    wherein said step of providing a stop operation signal comprises generating corresponding first and second stop operation signals during concluding portions of said first and second periods.

5. The method of claim 4 wherein said first and second stop operation signals endure for limited times beyond the end of said first and second periods, respectively.

6. The method of claim 4 wherein said step of providing a stop operation signal comprises providing said stop operation signal during a termination of periods when first and second signals are applied to a storage device used in the conversion process.

7. The method of claim 4 wherein said step of operating the converter includes applying an analog signal to a device during a first period and applying a reference signal to said device during a second period subsequent to the first period; and
    wherein said step of applying stop operation signals occurs during a third period and a fourth period subsequent to the third period, the third period corresponding to but shorter than the first period, the fourth period corresponding to but shorter than the second period.

8. The method of claim 7 wherein said third period begins after the first period begins and ends after the first period ends; and
    wherein the fourth period begins after the second period begins and ends after the second period ends.

9. The method of claim 7 wherein said third period begins before the first period ends, ad wherein the fourth period begins before the second period ends, so that the third period includes the ending of the first period and the fourth period includes the ending of the second period.

10. A method of processing digital signals in a central processing unit (CPU) of a microcomputer having an analog to digital (A/D) converter, comprising the steps of:
    applying to the A/D converter a first analog in a first period and a second signal in a second period after said fist period so that the A/D converter generates data in digital form;
    applying to the central processing unit (CPU) a stop operation signal during respective concluding portions of said first and second periods,
    wherein said concluding portion of said first period corresponds to a third period that is shorter than said first period and said concluding portion of said second period corresponds to a fourth period that is shorter than said second period.

11. The method of claim 10 wherein said stop operation signal is active for a limited time beyond the end of each of said first and second periods.

12. The method of claim 10 wherein said respective concluding portions of said first and second periods substantially correspond to termination periods when said first and second signals are respectively applied to a storage device used by the analog to digital converter.

13. The method of claim 10 wherein said third period begins after the first period begins and ends after the first period ends and said fourth period begins after the second period begins and ends after the second period ends.

14. The method of claim 13 wherein said third period begins before the first periods ends and the fourth period begins before the second period ends so that the third period includes ending of the first period and the fourth period includes ending of the second period.

15. The method of claim 10 wherein said applying step is executed in every analog to digital conversion cycle.

* * * * *